May 30, 1933.   R. B. FUNK   1,912,269
ENGINE MOUNTING
Filed June 27, 1932   2 Sheets-Sheet 1
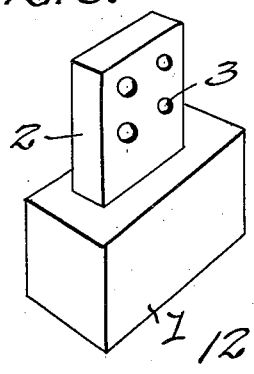
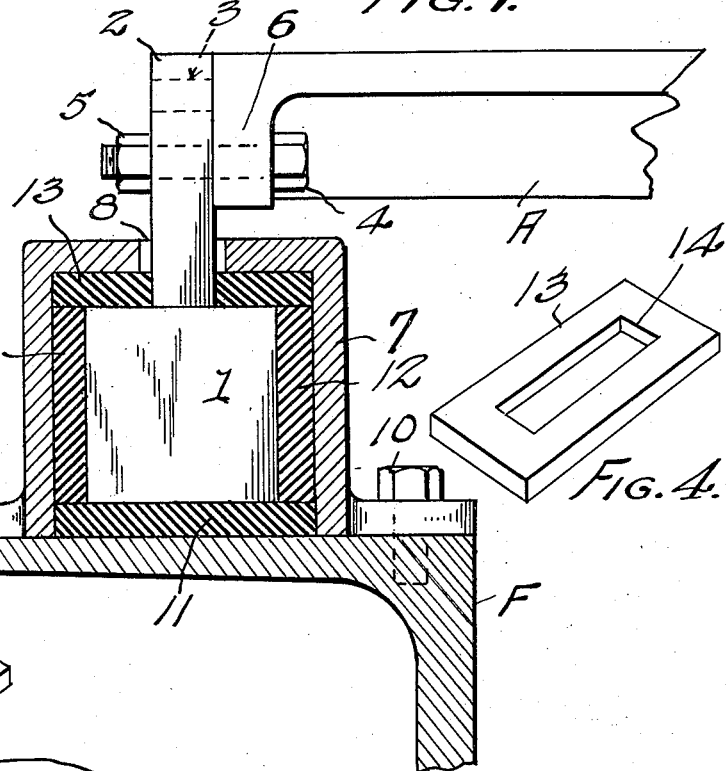
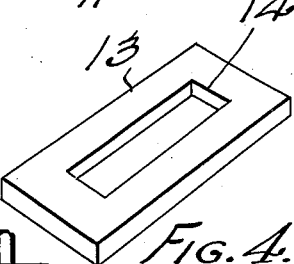
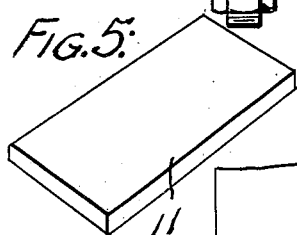
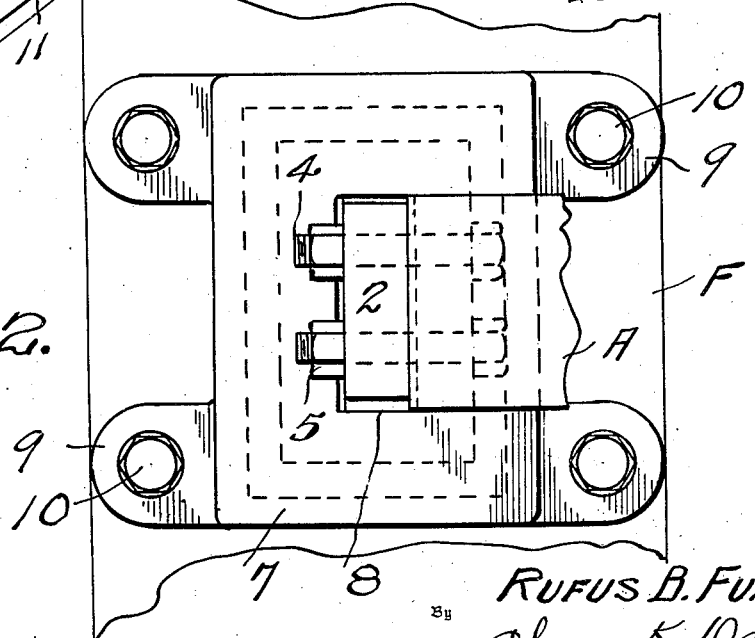
Inventor
RUFUS B. FUNK
Chas K. Davies
Attorney

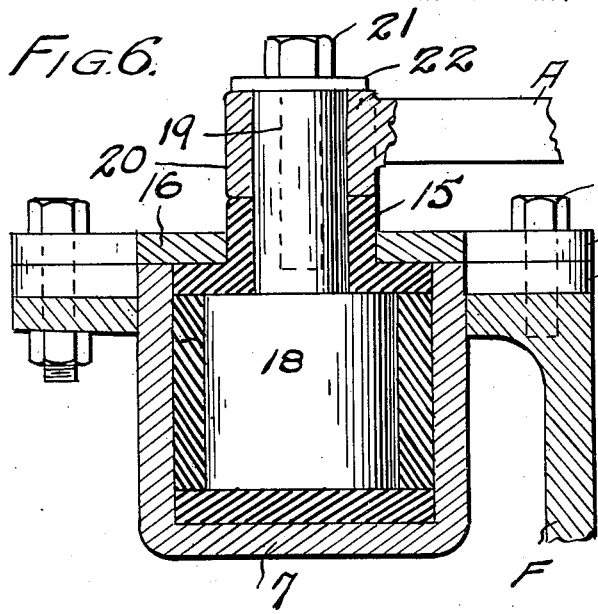
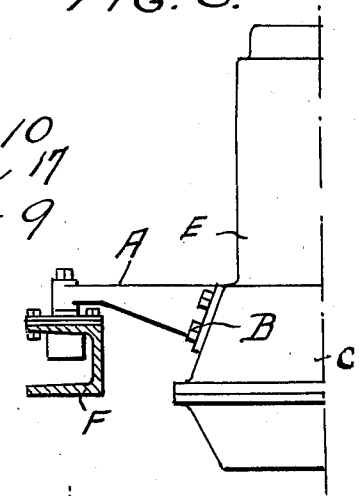
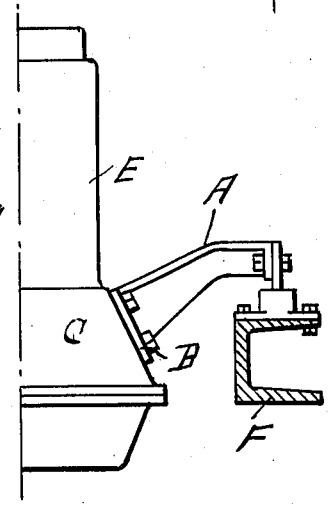
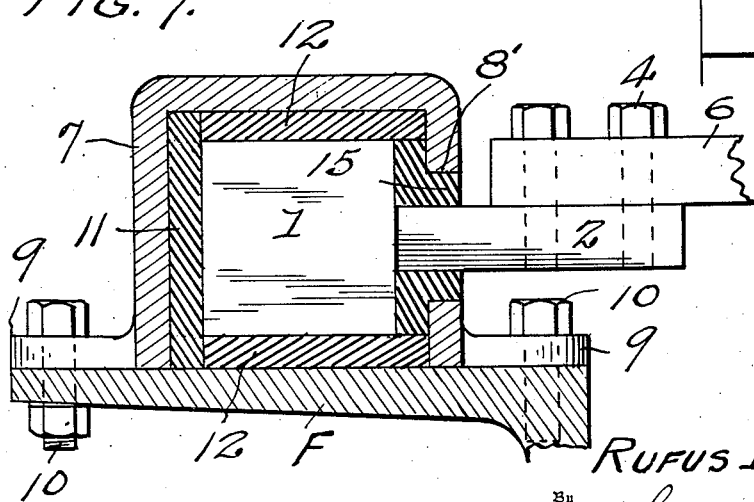

Patented May 30, 1933

1,912,269

UNITED STATES PATENT OFFICE

RUFUS B. FUNK, OF WASHINGTON, DISTRICT OF COLUMBIA

ENGINE MOUNTING

Application filed June 27, 1932. Serial No. 619,550.

My invention relates to improvements in means for insulating jointed structures against the transmission of vibrations and sound, and as a specific exemplification of my invention I have herein shown the principles of the invention embodied in an engine mounting for automotive vehicles and other vehicles or craft. As is well known, the bodies, frames, and operating parts and units of automotive vehicles, which are composed of materials that are good conductors of vibrations and sounds, transmit these vibrations and sounds through non-insulated joints, from one part to another, without interruption. The transmission of these vibrations and sounds results in trembling of the frame and body of the vehicle, as well as in humming noises and roars when the vehicle is traveling, to the discomfort of the rider or riders of the vehicle. By the utilization of the principles of my invention, I eliminate the transmission of these vibrations and sounds, by completely insulating the joints between metals and other materials used, that are good conductors of vibrations and sounds, through the use at the joints, of interposed insulators of non-conducting material.

The insulating material may be resilient, as when rubber or rubber compositions are employed, or leather, felt, and other similar materials may be employed at the joints for absorbing the vibrations and sounds originating in one part of the structure, and for preventing such vibrations and sounds from passing to another part of the structure.

In carrying out my invention I contemplate the use of insulating material at all joints between metallic, or vibration and sound-transmitting parts, to insure complete and total absorption of all vibrations and sounds arising in one part or unit of the vehicle structure. Specifically, I provide an insulated joint between a supporting member and a supported member, as for instance, the frame of a vehicle and the engine or motor for propelling the vehicle, whereby the joint, is insulated against transmission of vibrations and sounds, and in addition, I equalize the lateral, vertical, and end thrusts or strains that occur between the frame and the motor, or the supporting member and the supported member.

While I have shown and described an exemplification of the invention as specifically applied to the engine and frame of an automotive vehicle, it will be understood that the principles of the invention are applicable for use at other places, as for instance between the body and frame, between the radiator and frame, between axles and springs, in the connection of the longitudinal and transverse bars of the frame or chassis, &c.

The invention consists in certain novel combinations and arrangements of parts as will hereinafter be more fully set forth and claimed. In the accompanying drawings I have illustrated several forms of the specific exemplification of the invention, in which the parts are combined and arranged according to modes I have thus far devised for the practical application of the principles of my invention, but it will be understood that changes and alterations may be made within the scope of my appended claims without departing from the principles of my invention.

Figure 1 is a vertical sectional view showing an insulated and cushioned joint between the rigid bracket arm of a motor and the channel side beam of a vehicle frame or chassis, where the weight of the supported load is imposed perpendicularly on the joint head at the top of the channel beam.

Figure 2 is a top plan view of the jointed structure of Figure 1, with the bracket arm broken away and showing only its outer end attached to the head.

Figure 3 is a perspective view of the head and its arm used in the joint of Figures 1 and 9.

Figure 4 is a perspective view of one of the insulating pads used with the arm of the joint head, and Figure 5 is a similar view of another pad.

Figure 6 is a sectional detail view similar to Figure 1 showing a slightly modified form of the insulated joint, in which the weight or load is imposed upon a head that is depressed in the channel beam.

Figure 7 is a sectional detail view of a further modified form of the invention, where the load is imposed upon a lateral supporting arm of the joint-head.

Figure 8 is an assembly view showing the construction of Figure 6 applied to the engine and frame, and Figure 9 is an assembly view of the construction of Figure 1 applied to the frame and motor.

In order that the general assembly and arrangement of parts may readily be understood I have indicated in Figures 8 and 9 a conventional type of motor or engine E having the usual crank case C, which is supported from the frame F shown as a channel side beam of the chassis of an automotive vehicle. The motor or engine E is supported from the frame F by a suitable number of arms A, located at desirable points or positions with relation to the motor and bolted to the crank case at B.

In carrying out my invention I employ a joint involving the use of a head 1, having a perpendicular arm 2 and provided with holes 3. In Figure 6, the head 18 is round, as is also the arm 19. In Figures 1, 3, and 7, the head is of rectangular shape, with its longer, longitudinal axis or dimension parallel with the longitudinal axis of the vehicle for the purpose of resisting the longitudinal strains that are imposed at the joint, such strains being found to be greater than lateral strains imposed against or arising in the vehicle structure.

The arm 2 of the head is rigidly attached, as by bolts 4 and nuts 5 to an attaching flange 6 formed integral with the bracket arm A. In Figure 1 the joint head is mounted on top of the frame F, within a housing 7, which is shaped to conform to the shape of the head 1, and fashioned with a top hole 8 to accommodate the upright attaching arm 2 of the head, which arm, as shown projects above the top of the housing 7.

The housing 7, which retains the head 1 has an open bottom, and is provided with laterally projecting, perforated lugs 9 through which bolts 10 are passed, and the bolts as indicated are employed to rigidly attach the housing at the top face of the channel beam or frame F.

The head 1 and its attaching arm 2 are thoroughly and completely insulated from the channel beam or frame F, although directly attached to the bracket arm A of the engine. Thus, cushioning pads 11 of non-conducting material, as rubber, rubber composition, felt, leather, or other suitable material that will not transmit vibrations and sounds, are employed between the head and the frame F, and similar pads 12 and 13 are interposed between the head and the housing, the pad 13, as indicated in Figure 4, being provided with an opening 14 to accommodate the attaching arm 2 of the head 1.

In some instances, the insulating pads used in connection with the attaching arm are provided with bosses 15, and in Figure 7 this boss projects through an opening 8' in the side of the housing 7, to insulate the arm and head from the housing.

The insulating pads may be used in various ways, as for instance, in lieu of the separate pieces 11, 12, 13, the rubber may be molded about the head within the housing. The insulating material may also be slightly compressed while under strain, or the insulating pads, when fashioned of resilient material and under tension, may permit a slight relative movement between the head and the housing, within limits, to absorb vibrations, strains, or stresses between the rigid arm A of the engine and the frame F.

In lieu of the several perforated ears or lugs 9 of the housing, other attaching means, as integral flanges on the housing may be employed for rigidly attaching the housing on the beam F.

In Figure 6 a modification of the arrangement of the head and housing is indicated, whereby the housing is depressed and suspended or supported within the channel beam F, an opening for that purpose being provided in the top flange of the beam, thereby permitting a compact arrangement of the housing with relation to the beam. In this form of the invention the housing is inverted, with its open end at the top and projecting through the top flange of the channel beam, so that the perforated ears or lugs 9 rest upon the top face of the beam. A cap plate 16, having an open center to accommodate the boss 15 of the upper insulating pad, is fashioned with perforated ears or lugs 17 complementary to the lugs 9, and the bolts 10 pass through the holes of the ears 17 and 9 into the channel beam.

By the utilization of the cap plate 16, not only is the upper insulating pad retained within the housing, but the latter is also rigidly secured in its depressed position in the channel beam to insure a stable anchorage for the joint head by decreasing the leverage between the bracket arm A and the housing and frame F, when vibrations occur between the motor and the frame.

In Figure 8 the shape of the head 18 and attaching arm 19 are also different than in Figure 1, as these parts 18 and 19 are round, or circular as solid cylinders, and in accord with this form of the head and attaching arm, the bracket arm A is provided with an attaching sleeve or bushing 20 that fits down over the top of the round arm 19, and rests upon the boss 15 of the upper insulating pad of the head. A suitable bolt 21, and washer 22 are employed to secure the sleeve 20 rigidly on the attaching arm 19, and the bracket arm and attaching arm of the head are thus rigidly joined.

In Figure 7 another arrangement of the bracket arm is shown where the flange 6 of the arm is attached on the upper face of the laterally projecting attaching arm 2 of the head 1. The opening 8' is also provided in the side of the housing 7 to accommodate the laterally projecting attaching arm 2, and the housing is attached, by its bolts 9 to the top of the top flange of the frame bar F.

The three forms of the invention shown in Figures 1, 6, and 7 may be adopted or used selectively under different existing conditions and to accomplish different purposes, but the same principles of insulating the motor from the frame apply in each case, and vibrations and sounds originating in either the supporting member or the supported member, are interrupted by the insulated joint and their transmission from one part to another part is prevented.

Having thus fully described my invention, what I claim as new and desire to secure by Letters Patent is:—

1. In an insulated joint, the combination with a supporting member, of a housing rigidly attached to said member and having an open end parallel with said member, said housing having a comparatively small hole in one of its walls, a head enclosed within the housing and uniformly spaced therefrom and an arm on the head projecting through said hole, pads of non-conducting material between said head and housing and an insulating pad in contact with said head and located between said head and the supporting member, and an attaching bracket bolted to said arm, whereby a uniform resistance to movement of the head is provided in all directions.

2. In an insulated joint, the combination with a supporting member, of a housing rigidly attached to said member and having an open end parallel with said member, said housing having a comparatively small hole in one of its walls, a head enclosed within the housing and an arm on the head projecting through said hole, insulating pads between said head and housing, and substantially filling the entire space therebetween, an insulating pad between said head and supporting member and in contact therewith, one of said pads having an insulating boss located in said hole and surrounding said arm, and an attaching bracket secured to said arm.

3. In an insulated joint, the combination with a supporting member having a hole therein, a housing seated in said hole and provided with an open upper end, a cover plate for said open end and means for fastening said plate to the supporting member, of a head enclosed within the housing, insulating pads between said head and housing, said cover plate having an opening therein, an arm on the head projecting through said opening, an insulating pad between said head and plate and a boss on said pad located in the plate-opening and surrounding said arm, a bracket, and means for attaching said bracket to the arm.

4. In an insulated joint, the combination with a member having a rigid, substantially rectangular housing, of a second member having a rigid, substantially rectangular head of comparatively large size enclosed within the housing and spaced therefrom, and a relatively thin layer of resilient material completely enclosing the head and interposed between the head and housing, whereby vibrations generated in either of said members are reduced to a small amplitude.

In testimony whereof, I affix my signature.

RUFUS B. FUNK.